US007559738B2

(12) United States Patent
Salm et al.

(10) Patent No.: US 7,559,738 B2
(45) Date of Patent: Jul. 14, 2009

(54) DEVICE AND A METHOD FOR SWITCHING PALLETS

(75) Inventors: Thomas Salm, Aachen (DE); Bernfried Kutsch, Stolberg (DE)

(73) Assignee: Winkler + Dünnebier Aktiengesellschaft, Neuwied (DE)

( * ) Notice: Subject to any disclaimer, the term of this patent is extended or adjusted under 35 U.S.C. 154(b) by 381 days.

(21) Appl. No.: 10/992,237

(22) Filed: Nov. 18, 2004

(65) Prior Publication Data

US 2005/0175436 A1    Aug. 11, 2005

(30) Foreign Application Priority Data

Feb. 9, 2004    (EP)    ................... 04002815

(51) Int. Cl.
*B65G 57/00*    (2006.01)
(52) U.S. Cl. ...................................... 414/799; 414/801
(58) Field of Classification Search ............ 414/331.03, 414/401, 608, 677, 799, 789.9, 806, 277, 414/282, 286, 801; 198/750.1, 950
See application file for complete search history.

(56) References Cited

U.S. PATENT DOCUMENTS

| | | | |
|---|---|---|---|
| 3,645,409 A | | 2/1972 | Sinclair |
| 3,836,018 A | | 9/1974 | Dawson et al. |
| 4,015,732 A | * | 4/1977 | Beaty et al. .................. 414/802 |
| 4,199,289 A | * | 4/1980 | Segbert et al. .............. 414/347 |
| 4,708,564 A | * | 11/1987 | Mylrea et al. ............ 414/789.1 |
| 4,764,074 A | * | 8/1988 | Postigo .................... 414/795.2 |
| 4,850,783 A | | 7/1989 | Maekawa |
| 5,283,934 A | * | 2/1994 | Zimpel et al. ................ 29/33 P |
| 5,943,766 A | * | 8/1999 | Beane .......................... 29/772 |
| 5,951,238 A | * | 9/1999 | Duecker .................. 414/794.9 |
| 6,152,678 A | * | 11/2000 | King et al. ............... 414/749.5 |
| 6,340,282 B1 | | 1/2002 | Bar et al. |
| 6,361,265 B1 | * | 3/2002 | Mahoney .................... 414/497 |
| 6,652,213 B1 | * | 11/2003 | Mitchell et al. ............. 414/284 |
| 2003/0072642 A1 | * | 4/2003 | Evans ......................... 414/539 |

FOREIGN PATENT DOCUMENTS

| | | |
|---|---|---|
| DE | 33 14204 A1 | 11/1983 |
| DE | 3417736 A1 | 11/1985 |
| DE | 41 09 294 A1 | 10/1991 |
| DE | 200 12 197 U1 | 2/2001 |
| FR | 2 207 076 | 6/1974 |

OTHER PUBLICATIONS

European Search Report dated May 17, 2004 (2 pages).

* cited by examiner

*Primary Examiner*—Charles A Fox
(74) *Attorney, Agent, or Firm*—Osha • Liang LLP

(57) ABSTRACT

A device is described for changing pallets in an automatic palletizer that arranges objects on the pallets. The object was to refine such a device in such a way that it not only minimizes the space occupied by the automatic palletizer, but also enables the length of interruptions in the palletizing process to be reduced. To solve this object, it is suggested to provide a transfer vehicle having a first pallet area for receiving a first pallet, and a second pallet area for receiving a second pallet, and a driving arrangement for moving the transfer vehicle between at least a first position and a second position, wherein when the transfer vehicle is in its first position the first pallet region of the transfer vehicle can be loaded with an empty pallet while the objects can be arranged on a pallet in the second pallet area.

32 Claims, 15 Drawing Sheets

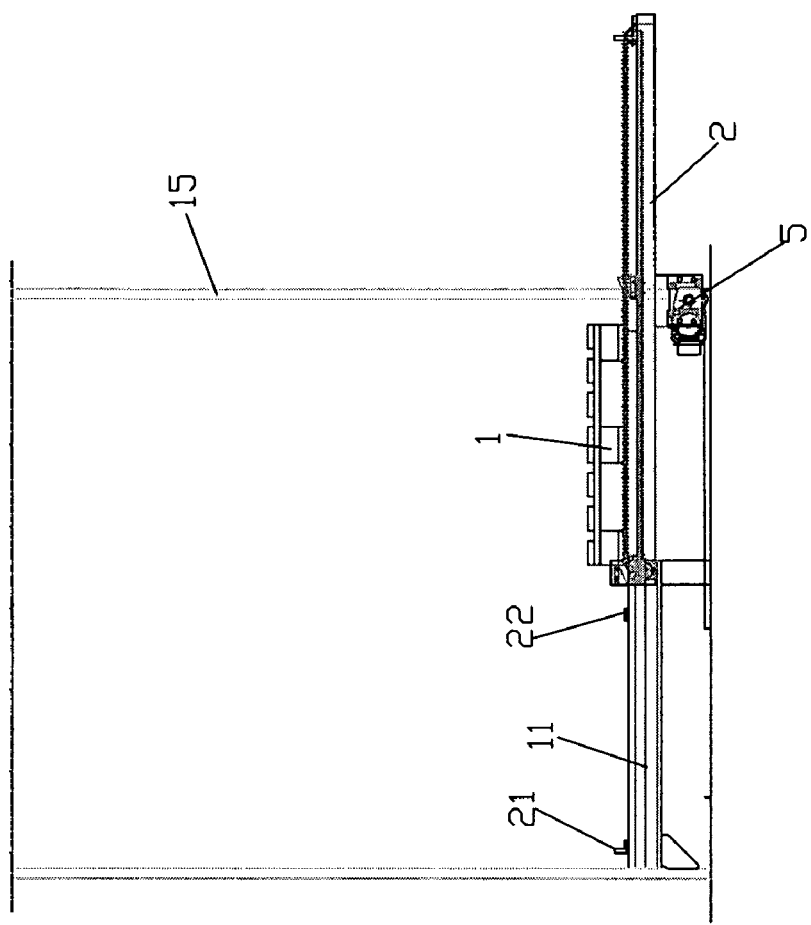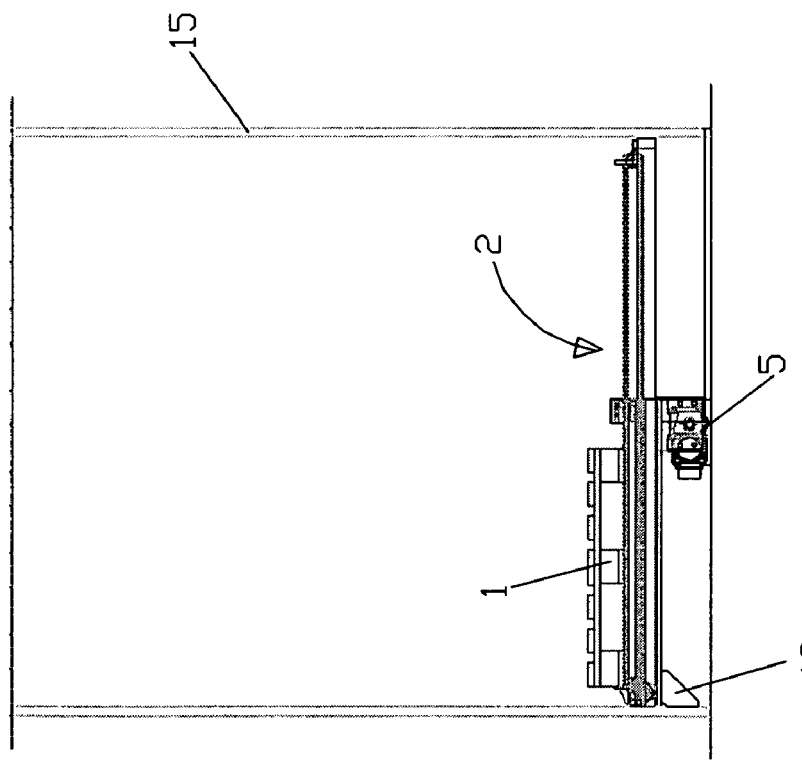

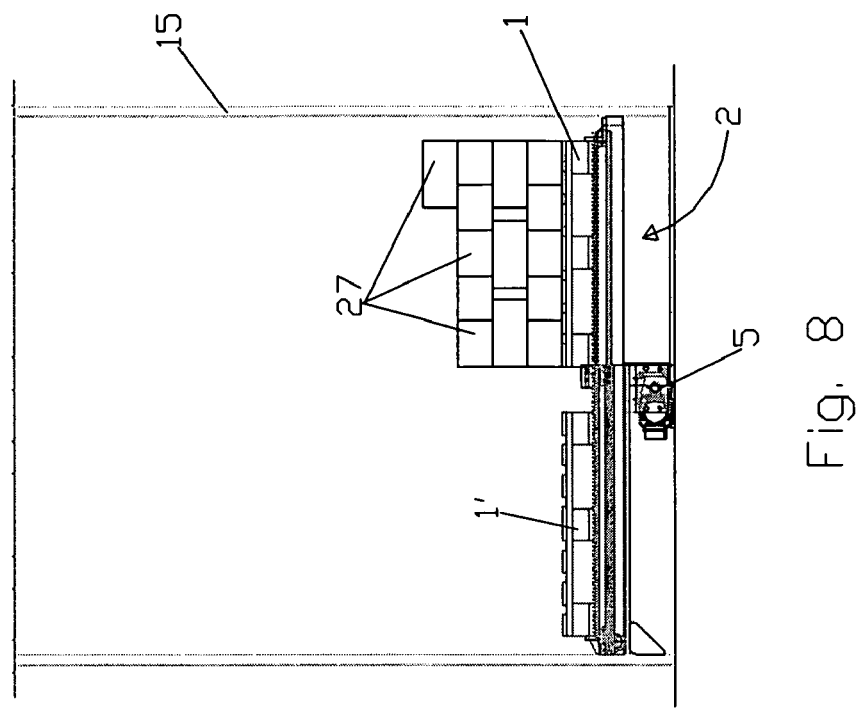
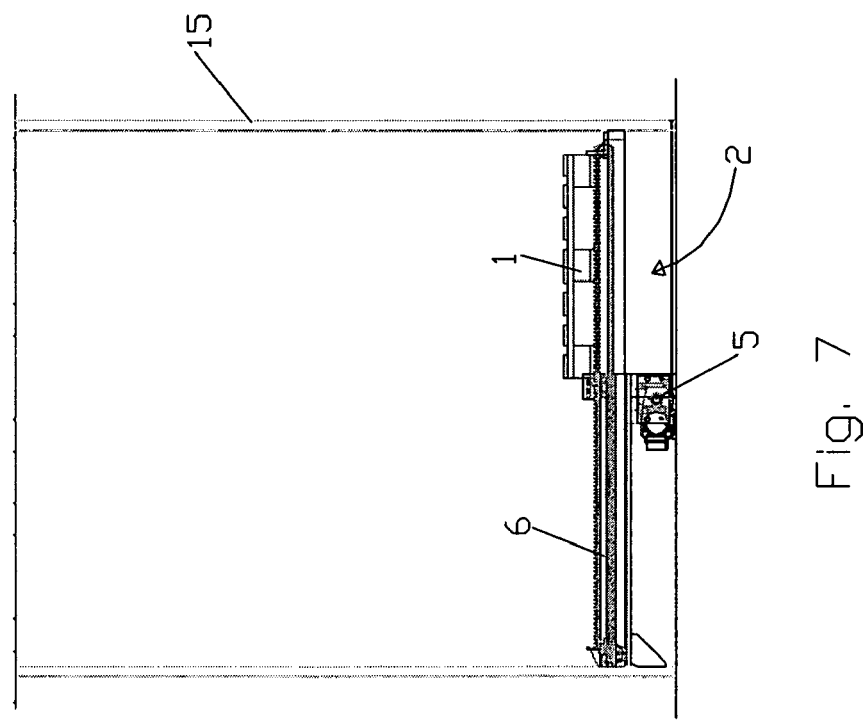

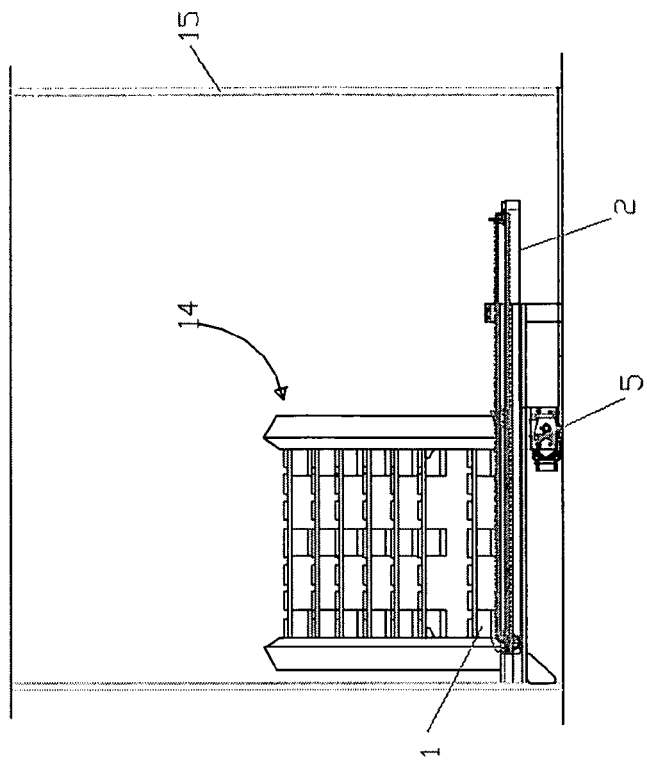
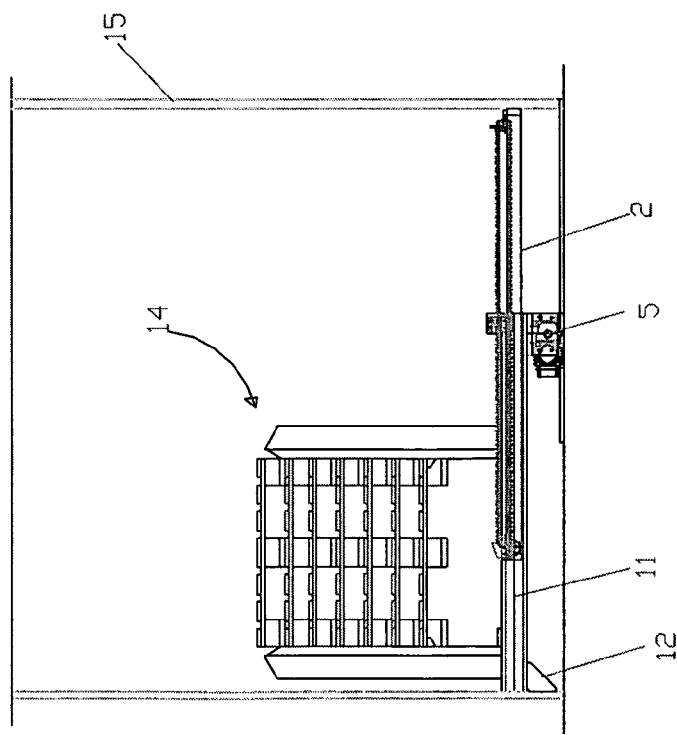

DEVICE AND A METHOD FOR SWITCHING PALLETS

CROSS-REFERENCE TO RELATED APPLICATION

The present application claims priority from European Patent Application No. 04002815.1, filed Feb. 9, 2004.

FIELD OF THE INVENTION

The present invention relates to a device for changing pallets in an automatic palletizer, for positioning objects on the pallets, an automatic palletizer having such a device, and a method for changing the pallets in the automatic palletizer. According to the present invention, the objects to be positioned on the pallets may particularly be envelopes, hygiene products, such as diapers, feminine hygiene products, tissues, and the like, as well as labels for bottles packed in boxes or other containers.

BACKGROUND OF THE INVENTION

It is known to use automatic palletizing equipment, i.e., automatic palletizers, in conjunction with envelope manufacturing machines. In this process, the finished envelopes discharged at the end of the envelope manufacturing machine are first supplied to an automatic packaging device, an automatic packer, which deposits a given quantity of envelopes in a packaging box and packs them therein in a manner secure for transport. The automatic packer is followed by an automatic palletizer including a palletizing robot and a device for changing the pallets. The palletizing robot accepts the packaging boxes coming from the automatic packer and arranges them in a space-saving manner suitable for transport on a pallet that is prepared at a loading station provided for that purpose.

As soon as a pallet is completely filled with packaging boxes, it must be replaced by an empty pallet in order to be able to continue the palletizing process. Devices for changing pallets are known which transport the loaded pallet via a fixedly installed, conventional roller and/or chain conveyor from the loading station to a collection station, from which the pallet may be collected by a forklift, for example. Moreover, the known devices have a supply station, from which an empty pallet may be supplied, also via a fixedly installed, conventional roller and/or chain conveyor.

The known devices having roller and/or chain conveyors for changing the pallets have two essential disadvantages. Firstly, they have a relatively substantial space requirement since the roller and/or chain conveyors must be fixedly installed at the supply station, the loading station, and the collection station. This leads to space problems particularly when the space behind the envelope manufacturing machine is limited and/or a plurality of envelope manufacturing machines are set up next to one another and the passage between the machines must be just wide enough to allow operating and maintenance work to be performed appropriately at the machine. The width of the passage required for this is typically smaller than the width to be provided when a collection station or a supply station having conventional roller and/or chain conveyor equipment is to be provided between two neighboring machines. Secondly, in the case of the known devices, the palletizing process must also be interrupted for an unacceptably long time in order to change the palettes, both to convey full pallets from the loading station to the collection station and also for conveying the empty palette from the supply station to the loading station, which can only take place subsequently.

BRIEF SUMMARY OF THE INVENTION

Accordingly, the object of the present invention is to provide a device for changing pallets in an automatic palletizer for positioning objects on the pallets, an automatic palletizer equipped with such a device, and a method for changing the pallets in the automatic palletizer, which minimizes the space requirement of the automatic palletizer and also facilitates the shortest possible interruption periods of the palletizing process.

This object is achieved with a device, an automatic palletizer, and a method having the features of claims 1, 12, and 13, respectively. Further embodiments of the present invention are described in the dependent claims.

The present invention suggests a device for changing pallets using a movable transfer vehicle that is able to accommodate a first pallet in a first pallet region and a second pallet in a second pallet region. A drive unit via which the transfer vehicle is movable between at least a first station and a second station is provided on the transfer vehicle and/or at a stationary point of the device which does not move with the transfer vehicle. Thus, in a first position of the transfer vehicle the first pallet region is at a supply station of the automatic palletizer, at which an empty pallet may be placed in the first pallet region. At the same time, when the transfer vehicle is in its first position the second pallet region of the transfer vehicle is at a loading station of the automatic palletizer. Therefore, the objects to be palletized may be arranged or stacked on a pallet located in the second pallet region preferably using a palletizing robot. When the transfer vehicle has moved to its second position, the first pallet region including the empty pallet is located at the loading station while the full pallet located in the second pallet region is moved to a collection station from which it may be collected by a forklift, for example, for subsequent shipment.

Moving the transfer vehicle from the first position to the second position advantageously results in the full pallet being conveyed from the loading station to the collection station and the empty pallet moving from the supply station to the loading station at the same time. As a result, the period for which the palletizing process must be interrupted is minimized in the present invention compared with the consecutive conveying of the full pallet to the collection station and the empty pallet to the loading station.

The transfer vehicle preferably has a non-driven means for relative pallet movement which renders it possible to move the transfer vehicle, preferably without significant friction, under a pallet which remains stationary with respect to its surroundings while the pallet continues to rest on the transfer vehicle or to be carried by the vehicle, i.e., to be in contact with the transfer vehicle. The means for providing relative pallet movement extends over both the first pallet region and the second pallet region and may be mounted on the transfer vehicle around deflection pulleys in an endlessly rotating manner. Alternatively, it is possible to create the means for relative pallet movement from one or more sliding rails attached to the transfer vehicle. Such sliding rails are able to slide easily along the underside of a palette while in contact therewith. The means providing for relative pallet movement particularly enables the transfer vehicle to be moved from its second position back to its first position after collecting a full pallet at the collection station without moving the pallet at the loading station relative to its surroundings, i.e. in the second position of the transfer vehicle in the first pallet region. As a result, the pallet at the loading station is able to be loaded with the objects to be palletized as the transfer vehicle under it passes through while simultaneously contacting, carrying, and supporting the pallet.

The present invention achieves the advantage that the collection station for collecting the full pallet may be provided outside of a racking system of the automatic palletizer, and specifically without the need to provide permanent roller and/or chain conveyors that occupy substantial space as in the related art. The second pallet region of the transfer vehicle, bearing the full pallet, moves simply in the manner of a self-supporting cantilever arm out of the racking system of the automatic palletizer to a position provided for collection purposes and functioning only temporarily as a collection station. After the transfer vehicle returns to its first position, this collection station is again completely free and may be used for other purposes, for example as a passage between two adjacent machines, i.e., as another traffic surface which is not limited with respect to its use by objects of the device of the present invention protruding from the floor.

The endlessly circulating means for relative pallet movement may preferably be one or more roller chains, in particular multiple strand roller chains. In chains of this type, a plurality of rollers is rotatably mounted between the links of two link chains. Other means for relative pallet movement, such as plastic and/or rubber belts endlessly rotating about deflection pulleys or in the form of rotatably mounted rollers protruding slightly from the surface of the transfer vehicle, are also conceivable.

According to the present invention, the transfer vehicle may be guided in its movement between the first position and the second position by a guide device. This preferably has at least two guide rails with which guide rollers rotatably mounted on the transfer vehicle engage. Alternatively it is conceivable to mount the guide rails on the transfer vehicle and to rotatably mount the guide rollers engaging therewith in a fixed manner on the racking system. One or more wheels are preferably positioned in the center region of the transfer vehicle and may be motor-driven by the drive unit. The preferably self-supporting, second pallet region of the transfer vehicle may be supported by one or more support wheels as necessary.

If the empty pallets are not to be individually supplied to the supply station, according to the present invention an automatic pallet magazine for storing empty pallets may be provided above the supply station or above the first pallet region of the transfer vehicle in the first position. Since the pallet magazine has a frame, it is preferably positioned at a certain minimum distance from the loading station to ensure that there is sufficient space around the pallet to be loaded to enable the palletizing robot to carry out its function. Therefore, the embodiment including the pallet magazine provides for a third position of the transfer vehicle in which the objects to be palletized may be deposited on a pallet located in the second pallet region. In this third position, the first pallet region of the transfer vehicle is not able to be loaded with an empty pallet. The transfer vehicle must be moved to the first position for this purpose.

BRIEF DESCRIPTION OF THE DRAWINGS

A number of embodiments of the present invention will be described for exemplary purposes with reference to the drawing. In the drawing:

FIGS. 5-13 shows side views of various operating states of a first embodiment of the device of the present invention not including a pallet magazine, specifically:

FIG. 5 shows the transfer vehicle in its first position including an empty pallet in the first pallet region, FIG. 6 shows the transfer vehicle in its second position, FIG. 7 shows the transfer vehicle after returning to the first position, FIG. 8 shows the transfer vehicle including an empty pallet in the first pallet region and an pallet being loaded in the second pallet region, FIG. 9 shows the transfer vehicle in its second position including the loaded pallet in the second pallet region, FIG. 10 shows the transfer vehicle according to FIG. 9, loading of the pallet located in the first pallet region having begun, FIG. 11 shows the transfer vehicle according to FIG. 10, the loaded pallet having been collected and an empty pallet having been supplied, FIG. 12 shows the transfer vehicle moved to the first position during the palletizing process, FIG. 13 shows the pallet vehicle extended into the second position following completion of the palletizing process, FIGS. 14-23 show side views of various operating states of a second device of the present invention including a pallet magazine, specifically:

FIG. 14 shows the transfer vehicle in its third position as well as the loaded pallet magazine, FIG. 15 shows the transfer vehicle moved to the first position to collect an empty pallet, FIG. 16 shows the transfer vehicle in the second position, including an empty pallet in the first pallet region, FIG. 17 shows the transfer vehicle moved back to the third position, FIG. 18 shows the transfer vehicle according to FIG. 17 during the palletizing process, the next empty pallet already having been separated, FIG. 19 shows the transfer vehicle including a loaded pallet in the first position, FIG. 20 shows the transfer vehicle including an empty pallet and a loaded pallet in the second position, FIG. 21 shows the transfer vehicle according to FIG. 20 during the palletizing process as well as a further, separated, empty pallet, FIG. 22 shows the transfer vehicle according to FIG. 21, the loaded pallet having been collected during the palletizing process, FIG. 23 shows the transfer vehicle returned to the third position during the palletizing process.

DETAILED DESCRIPTION

Figure 1:
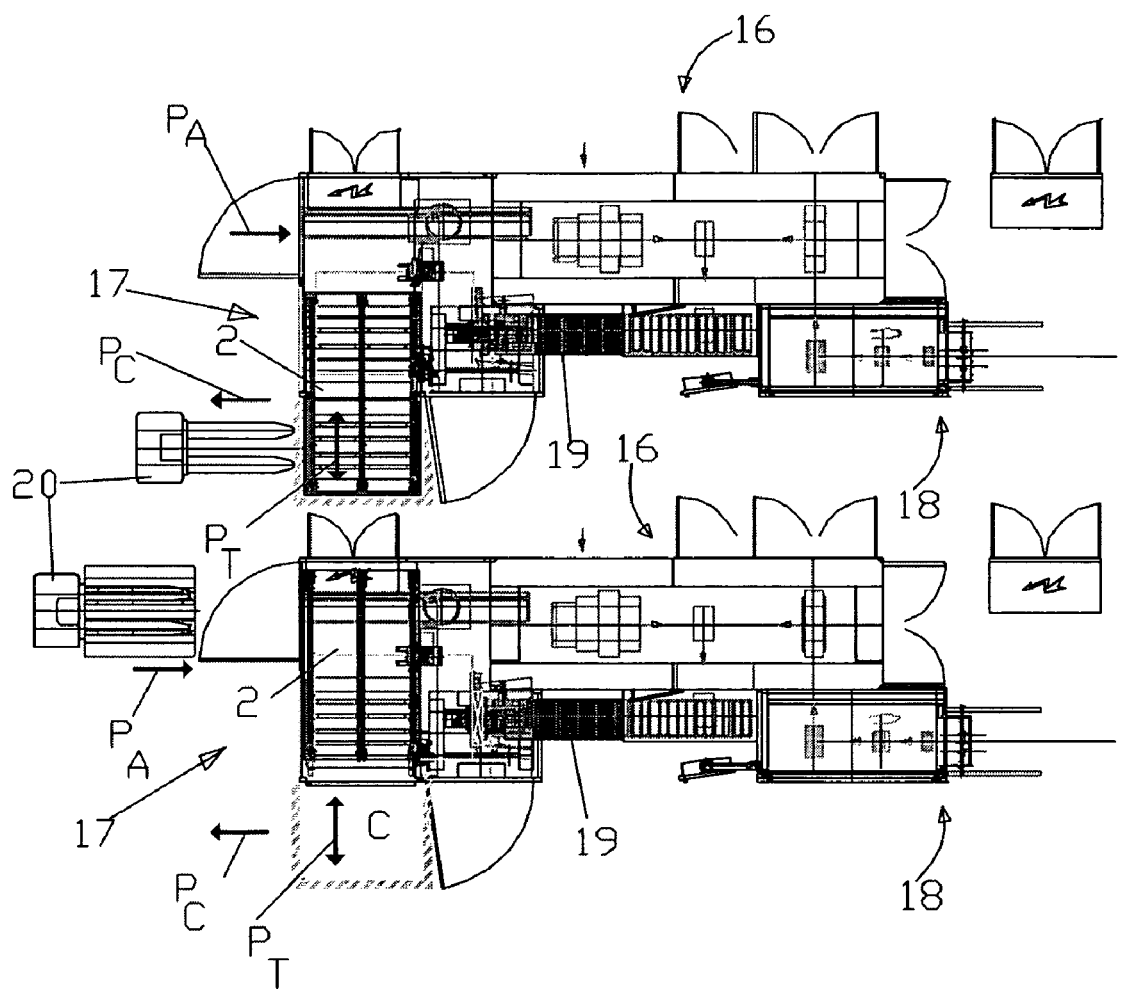
FIG. 1 shows a plan view of two automatic packers and two automatic palletizers of the present invention of two adjacent envelope manufacturing machines (not shown)

The plan view according to FIG. 1 shows two automatic packaging devices 16 and two automatic palletizers according to the present invention 17 with devices for changing pallets according to the invention. The rear ends 18 of two envelope manufacturing machines (not shown), which are adjacent FIG. 1, are also shown. The envelopes that are produced by the envelope manufacturing machines are fed to the respective automatic packaging device 16 at machine ends 18 in stacks, and the automatic packaging device packs the stacks of envelopes in packaging boxes. In the embodiment shown, the packaging boxes filled with finished envelopes serve as the objects to be palletized for the purposes of the present invention. They are each deposited on a conveyor belt 19, which transports them to the respective automatic palletizer 17.

Figure 2:
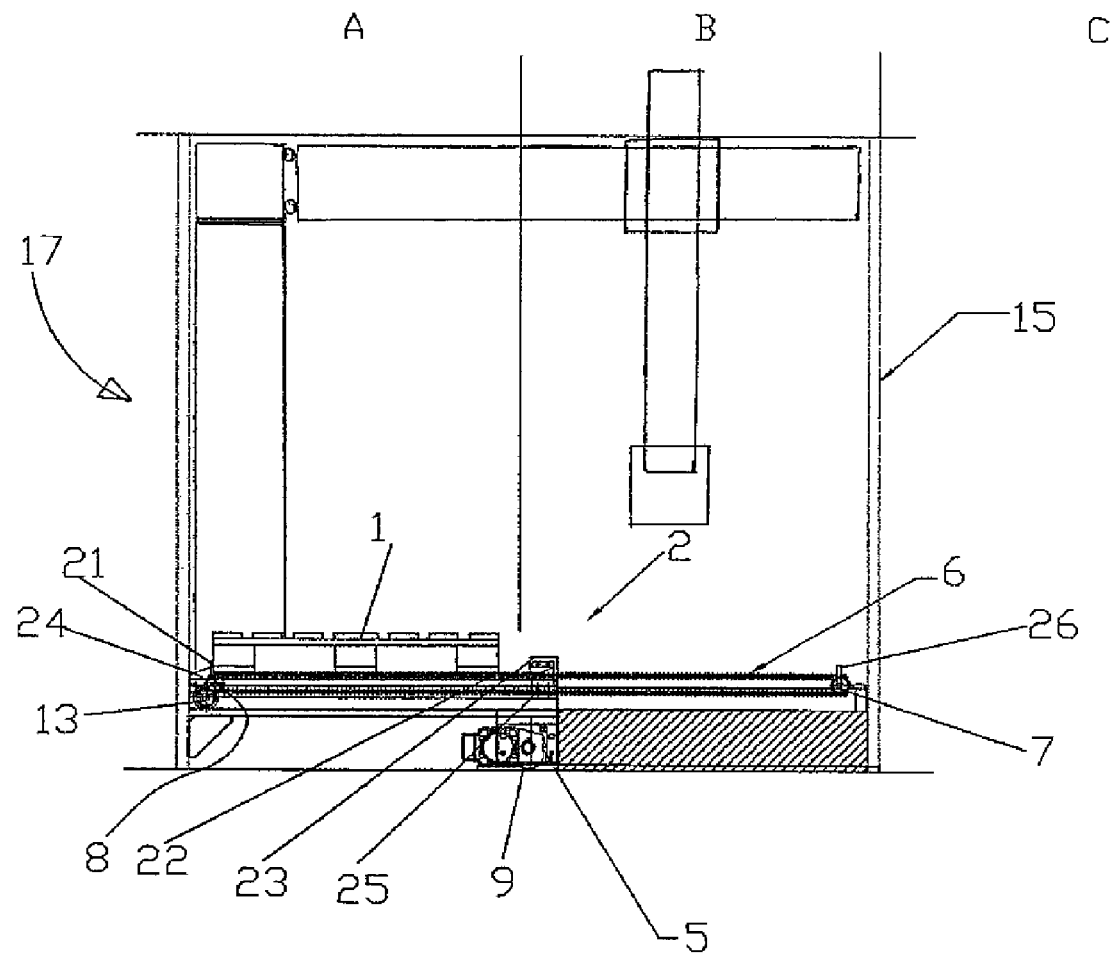
FIG. 2 shows a side view of a device of the present invention having a transfer vehicle in the first position.
Figure 4:
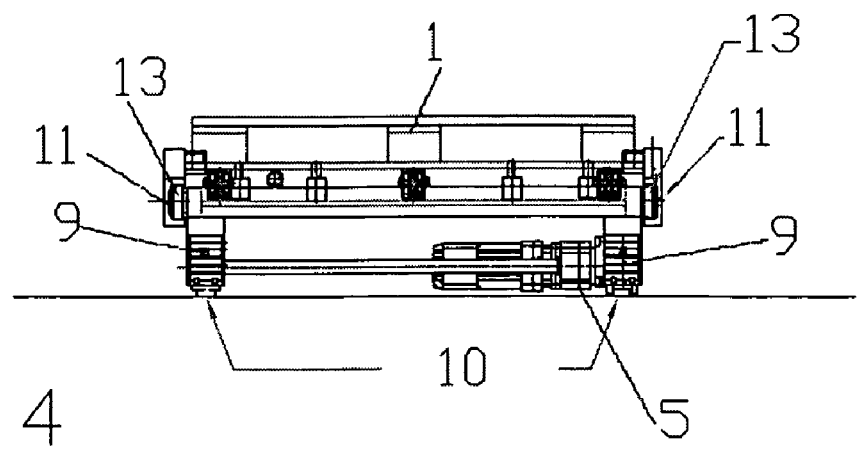
FIG. 4 shows a front view of the device of the present invention in the viewing direction according to FIG. 3 from below.
Figure 3:
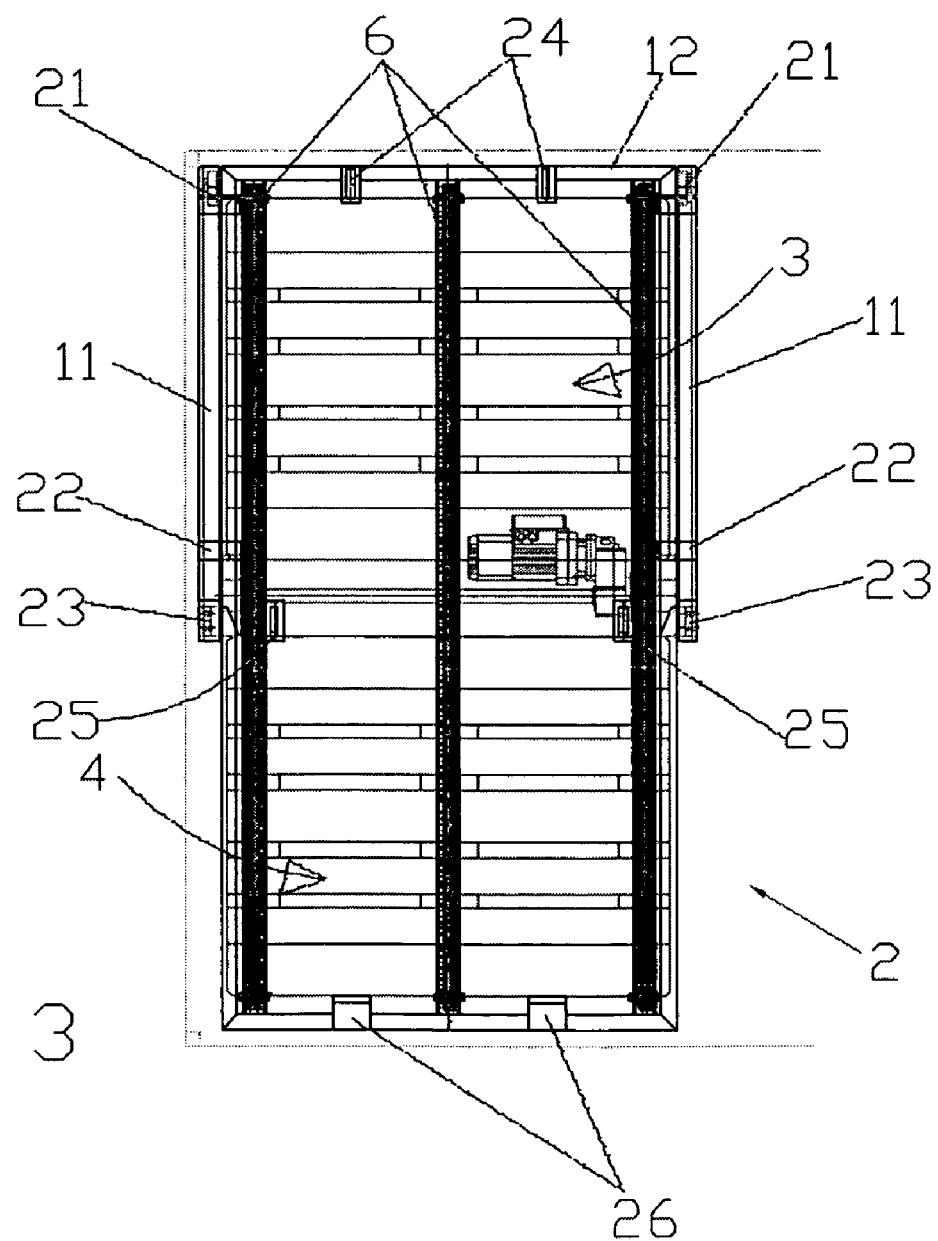
FIG. 3 shows a plan view of the device of the present invention according to FIG. 2.

Besides a palletizing robot, which picks up the packaging boxes from conveyor belt 19 and stacks them on a pallet, each automatic palletizer 17 includes the device according to the invention for changing pallets as shown in FIGS. 2 to 4. FIG. 2 shows a side view of the device according to the invention, as it appears essentially when the lower automatic palletizer in FIG. 1 is viewed from the left. Automatic palletizer 17 includes a racking system 15, within which transfer vehicle 2 as shown in FIG. 2 is located. As is most clearly seen in FIGS. 3 and 4, transfer vehicle 2 is supported so as to be movable linearly in two guide rails 11 of a rack frame 12, which is essentially U-shaped when viewed from above, wherein rotatably affixed guide rollers 13 that are attached to the sides of transfer vehicle 2 engage with guide rails 11 that have an essentially U-shaped cross-section.

An electric motor 5 mounted on the underside of transfer vehicle 2 serves as the drive unit for driving two wheels 9 of transfer vehicle 2, which are guided in rails 10 and may be seen most clearly in FIGS. 2 and 4. With electric motor 5, transfer vehicle 2 may be moved from a first position, as shown in FIGS. 1, 2 and 3, and into a second position, which is shown as it refers to the upper automatic palletizer 17 in FIG. 1. As transfer vehicle 2 is moved into the second position it travels to the right as in FIG. 2 and/or downwards as in FIG. 3. As is shown in FIG. 3, about half of the length of transfer vehicle 2 is extended onto guide rails 11 in the first position. In the second position, transfer vehicle 2 is extended almost entirely off guide rails 11, in which position however it is still supported by the right ends of guide rails 11 as in FIG. 2 or the lower end of the guide rails as in FIG. 3, to prevent tilting about the axis of wheels 9, which as shown in FIGS. 2 and 3 are arranged essentially in the middle of transfer vehicle 2.

In the embodiment shown, a total of three multiple strand roller chains 6 are fitted on transfer vehicle 2, each of which circulates endlessly about two deflection pulleys 7 and 8 as is shown in FIGS. 2 and 3. Multiple strand roller chains 6 are not driven actively, but simply roll over deflection pulleys 7 and 8 when a pallet 1 is retained relative to racking system 15 or rack frame 12. A first pallet area 3 and a second pallet area 4 of transfer vehicle 2 are visible in FIG. 3. In the example illustrated, these are essentially rectangular areas on the upper surface of transfer vehicle 2, in which pallets 1 may be arranged on transfer vehicle 2.

FIG. 2 shows a supply station A, a loading station B and a collection station C that is located away from racking system 15. An empty pallet 1 may be moved to supply station A in the direction of arrows PA in FIG. 1, for example with a forklift or manual pallet truck 20. At loading station B, a pallet located there may be loaded with the packaging boxes using the palletizing robot. A fully loaded pallet may be removed for subsequent shipping from collection station C in the direction of arrows PC when transfer vehicle 2 is in its second position, as shown at the top of FIG. 1. At the bottom of FIG. 1, transfer vehicle 2 is in its first position, in which it is located entirely inside the framework of racking system 15 of automatic palletizer 17. Collection station C, to which second area 4 of transfer vehicle 2 is moved only temporarily in the direction of double arrow PT is indicated by dashed lines in FIG. 1. Collection station C is thus permanently located outside of the racking system 15 of automatic palletizer 17, and thus does not represent a spatial component of the device according to the invention. It must only be available as a free area at the site where the device is installed, so that it may be used temporarily in the course of the proper operation of the device according to the invention.

The particularly advantageous space-saving effect of the present invention is shown clearly in FIG. 1. The two adjacent envelope manufacturing machines and their associated automatic packaging devices 16 as well as the automatic palletizers 17 may be moved closer together than in the prior art, since the space provided for collection station C space is no longer occupied permanently by roller and/or chain conveyors. A free passage between the envelope manufacturing machines that is essential for proper operation thereof is assured without further arrangement when transfer vehicle 2 is returned from its second position, shown at the top of FIG. 1, to its first position, shown at the bottom of FIG. 1.

For positioning transfer vehicle 2 at and moving the pallets between supply station A, loading station B and collection station C, the invention provides for various limit stops and attachments to be mounted on transfer vehicle 2 or on stationary rack frame 12 with the U-shaped cross-section when viewed from above. Two preferably angled limit stops 21 are secured to rack frame 12 as positioning aids for an empty pallet at supply station A. In addition, two attachments 22 are also fixed to rack frame 12 as positioning aids for an empty pallet at supply station A. Two limit stops 23 that are traversable in one direction from left to right in FIG. 2 and from top to bottom in FIG. 3 are attached to rack frame 12 for positioning a pallet on loading station B, and are preferably spring-biased when a pallet magazine is not used and preferably actuated externally when a pallet magazine is used. Two limit stops 24 that are traversable in one direction are attached to transfer vehicle 2 for taking an empty pallet from supply station A to loading station B when transfer vehicle 2 is moved from its second position to its first position. In addition, two limit stops 25 that are traversable in one direction from left to right in FIG. 2 and from top to bottom in FIG. 3 are attached to transfer vehicle 2 for securing a pallet at loading station B and at collection station C. Finally, 2 immovable, rigid limit stops 26 are attached to transfer vehicle 2 for securing a pallet at loading station B and collection station C. The number of limit stops and attachments in each set may also be reduced to one if required.

The process sequence for changing a pallet with the device according to the invention will be described in the following, with reference to one exemplary embodiment without and one with a pallet magazine.

FIGS. 5 to 13 show the chronological sequence of states during the pallet changing process according to the present invention, no pallet magazine being used in this sequence.

Initially, transfer vehicle 2 is in its first position as shown in FIG. 5, in which it is entirely surrounded by racking system 15 of automatic palletizer 17. An empty pallet 1 is deposited on the first pallet area 3 of transfer vehicle 2, which is at supply station A. The pallet is positioned using limit stop 21 and attachment 22. Transfer vehicle 2 then moves to its second position, as shown in FIG. 6, in which step empty pallet 1 is moved to loading station B at the same time by limit stop 24, and limit stop 23 on rack frame 12 is passed over. It would be possible for the palletizing operation to begin even at this point while transfer vehicle 2 is in its second position.

As shown in FIG. 7, transfer vehicle 2 then moves back to its first position, during which step limit stop 23 secures empty pallet 1 in position at loading station B and limit stop 25 is passed over. As a result, pallet 1, which is either empty or has already passed through the palletizing process, moves from first pallet area 3 to second pallet area 4 and the three multiple strand roller chains 6 circulate round their respective deflection pulleys 7 and 8. If the palletizing process has not yet started, as shown in FIG. 8 the pallet robot may then begin loading pallet 1, which is at loading station B. Packaging boxes 27 containing the envelopes are arranged on pallet 1 according to a preprogrammed stacking scheme. Either before the start of pallet 1 being loaded or after a brief interruption in the palletizing process, an empty pallet 1' may be placed on first pallet area 3 of transfer vehicle 2, which is at supply station A.

Figure 10:
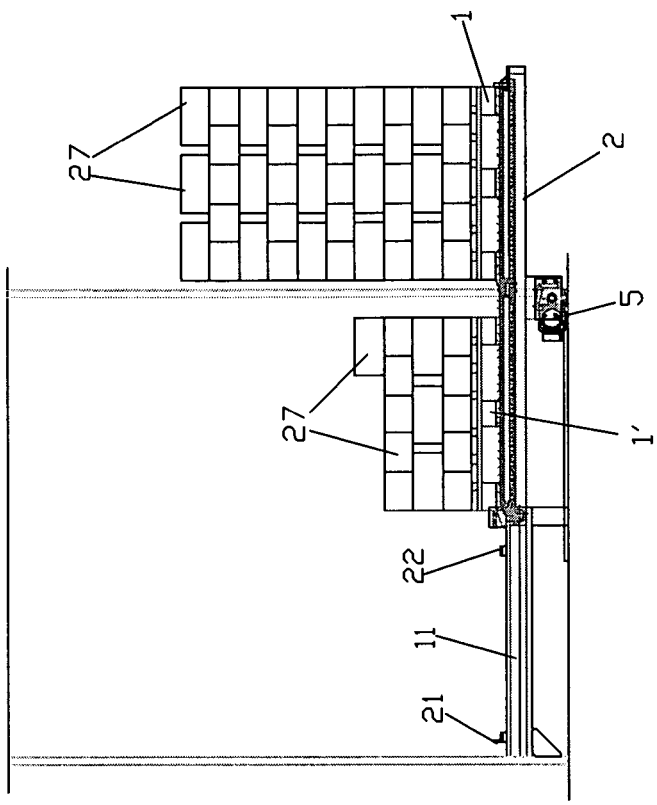
Figure 9:
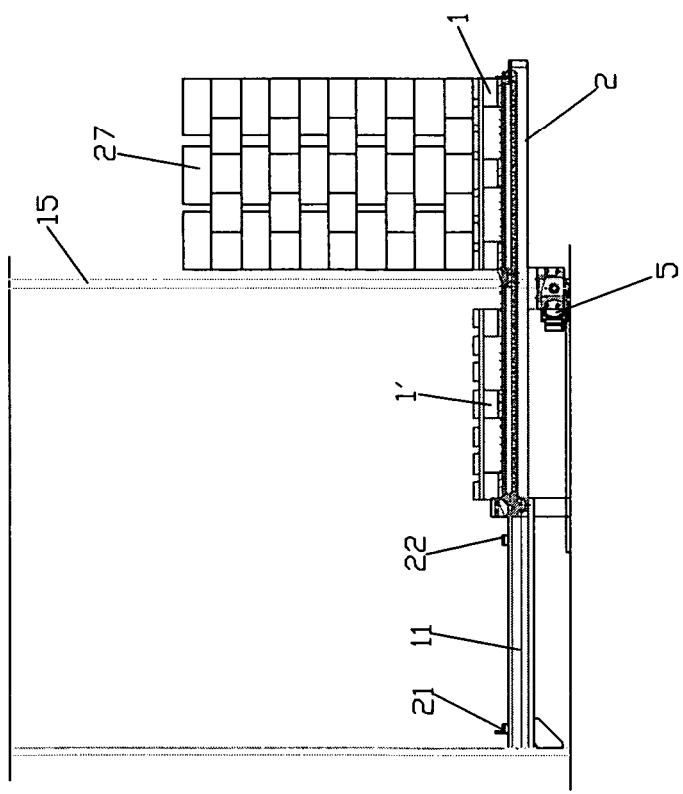

When pallet 1 has been fully loaded or palletized, transfer vehicle 2 moves to its second position, as shown in FIG. 9, at which time limit stop 23 is passed over by empty pallet 1' and full pallet 1 is transported to collection position C. In an advantageous manner according to the invention, full pallet 1 is removed from loading station B and empty pallet 1' is positioned at loading station B at the same time. FIG. 9 clearly shows that the right half of transfer vehicle 2 extends out of racking system 15 in the manner of a self-supporting cantilever arm. This is particularly advantageous from the point of view of workplace safety, since an operator in the direct vicinity of collection station C does not run the risk of having his foot run over. A further advantage consists in that an ideally unoccupied space for a movement of a floor transport vehicle is provided underneath transfer vehicle 2. However, it is also conceivable to support the protruding half of transport vehicle 2, as shown in FIG. 9, with one or more carrying wheels. As soon as empty pallet 1' arrives at loading station B, the palletizing process may begin again, i.e. pallet 1' may be loaded with packaging boxes 27 by the pallet robot, as shown in FIG. 10.

Figure 12:
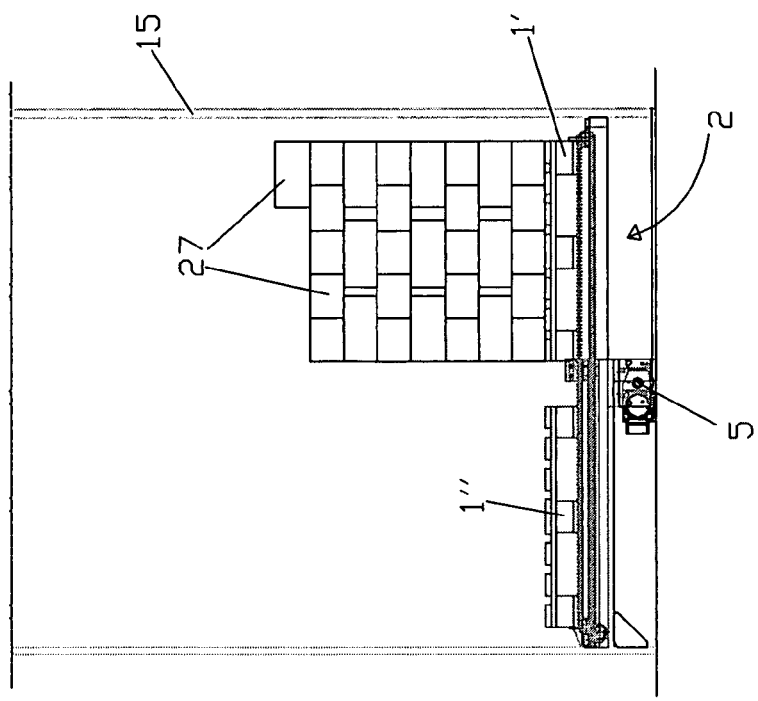
Figure 11:
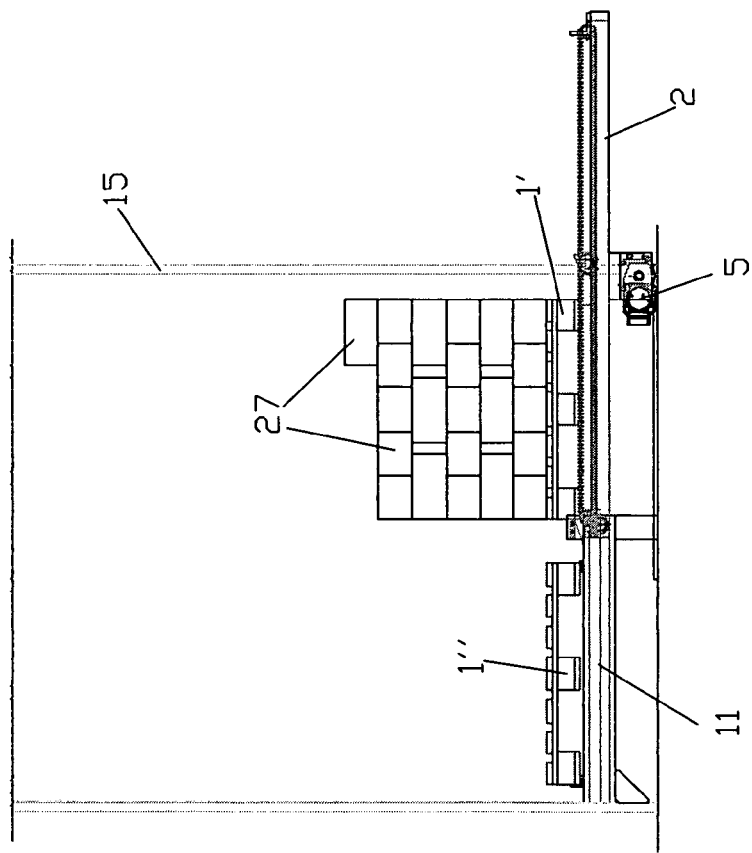

As shown in FIG. 11, the full pallet 1 may now be collected from collection station C and an empty pallet 1" may be positioned at supply position A with the aid of limit stop 21 and attachment 22. At this point, it is of no importance whether pallet 1 is collected before or after the empty pallet 1" is supplied. Since supplying the empty pallet 1" requires entry into the space defined by racking system 15 in which the palletizing robot is moving, a short interruption is necessary in the palletizing process. After full pallet 1 has been removed from second pallet area 4, which is at collection station C, and if necessary before empty pallet 1" is supplied, transfer vehicle 2 is moved back to its first position, as shown in FIG. 12, at which time limit stop 23 retains pallet 1' securely at loading station B and limit stop 24 is passed over by empty pallet 1". The transfer vehicle 2 may thus be moved back to its first position, as shown in FIG. 12 without interrupting the palletizing process for pallet 1'.

Figure 13:
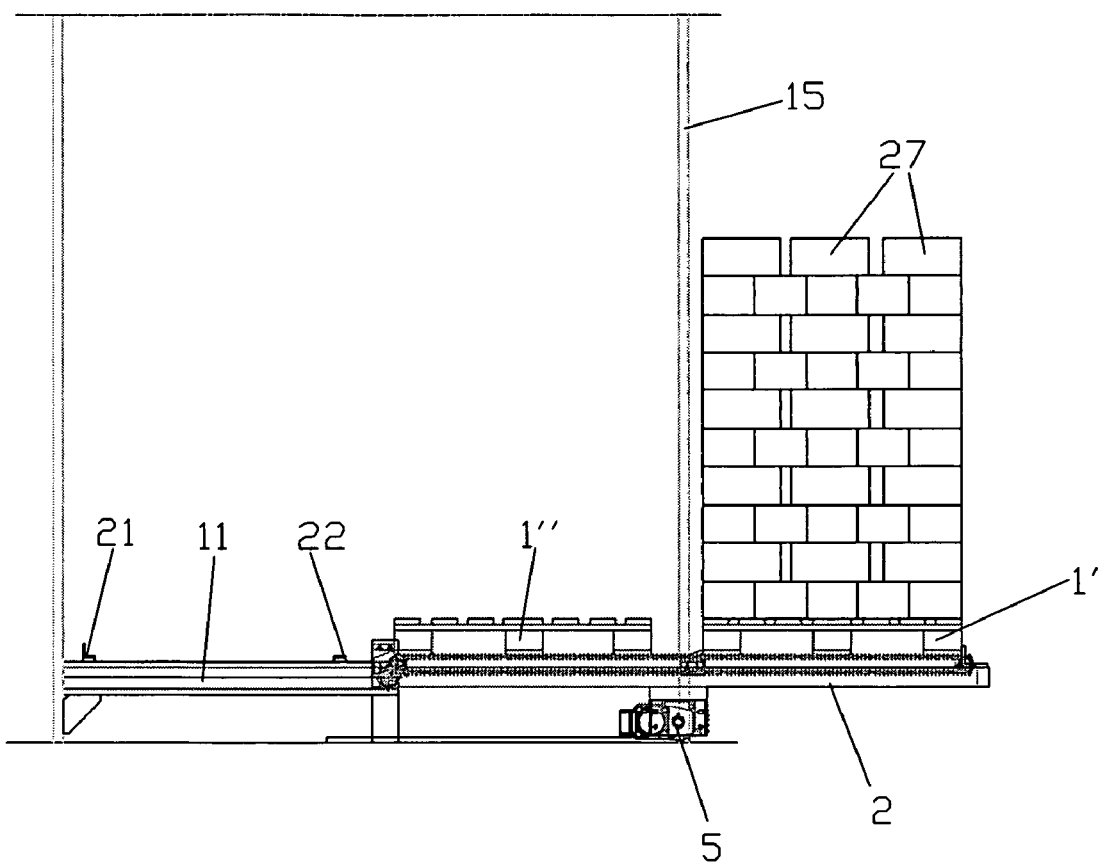

When pallet 1' has been palletized, transfer vehicle 2 is returned to is second position, as shown in FIG. 13, limit stop 23 being passed over by pallet 1". Pallet 1', which is now full, is transported from loading station B to collection station C, while at the same time empty pallet 1" is positioned at loading station B. The full pallet 1' may be collected from collection station C, which was occupied temporarily by the second pallet area 4 of transfer vehicle 2. Then, the pallet changing process is begun again and repeated as often as necessary starting from the position shown in FIG. 10.

FIGS. 14 to 23 illustrate the process sequence for changing pallets with a device according to the invention that includes a pallet magazine for storing empty pallets.

As shown in FIG. 14, a stack of empty pallets is first deposited at supply station A and lifted up using pallet magazine 14. In the embodiment shown, seven empty pallets are stored in pallet magazine 14. Transfer vehicle 2 is then moved to its first position, as shown in FIG. 15, in which the first pallet area 3 thereof may be loaded with an empty pallet 1, which has been separated in pallet magazine 14 beforehand.

Figure 16:
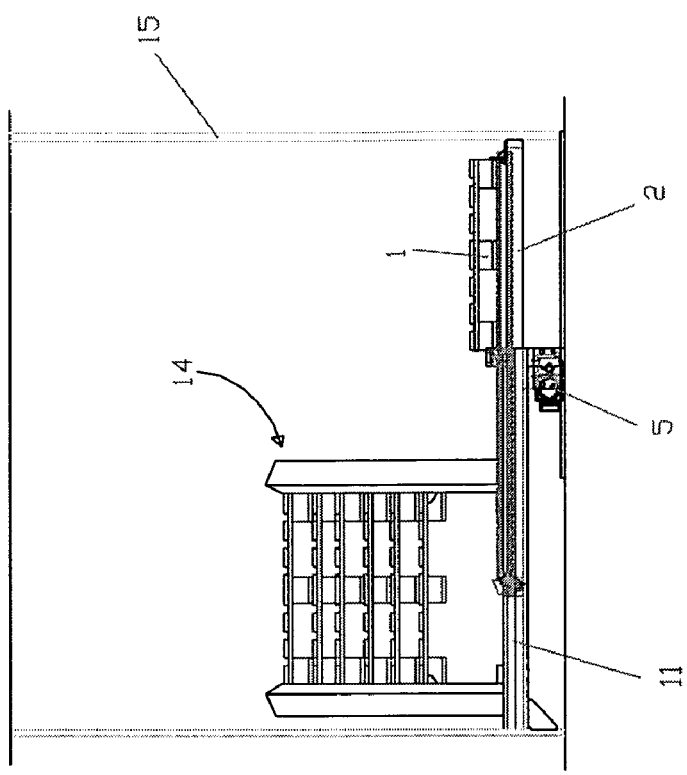
Figure 17:
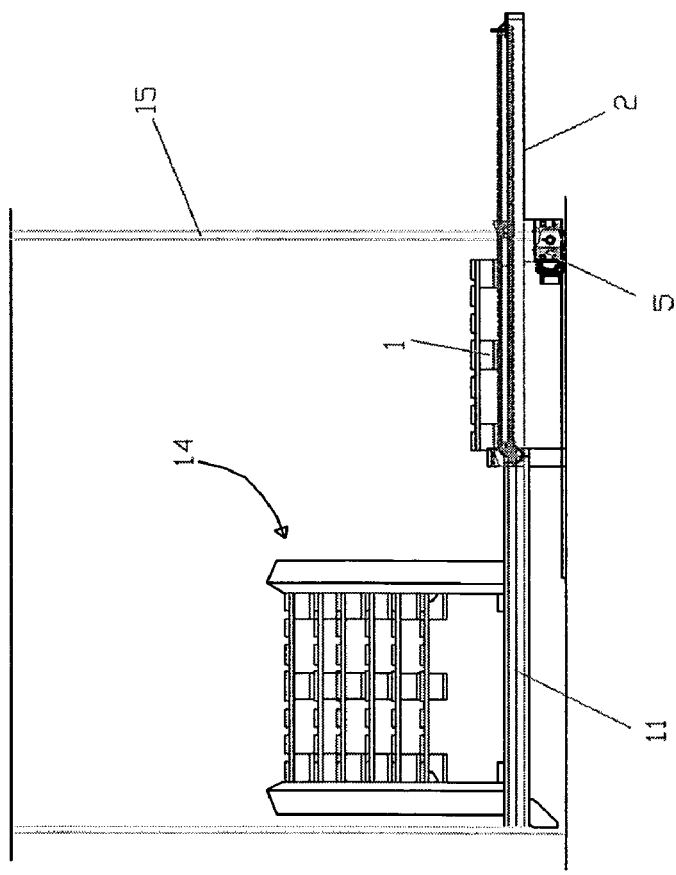

Then, transfer vehicle 2 is moved to its second position, as shown in FIG. 16, pallet 1 being moved at the same time to loading station B due to limit stop 24, and traversing limit stop 23. Thereafter, transfer vehicle 2 is moved to its third position as shown in FIG. 17, pallet 1 being retained in place at loading station B by limit stop 23 and limit stop 25 being passed over. In this third position, first pallet area 3, which as shown in FIG. 17 is located in the left half of transfer vehicle 2, cannot be loaded with an empty pallet from pallet magazine 14. This is because pallet magazine 14 must be sufficiently distant from loading station B to allow the palletizing robot to approach pallet 1 from the left side of loading station B also, as shown in FIG. 17.

Figure 19:
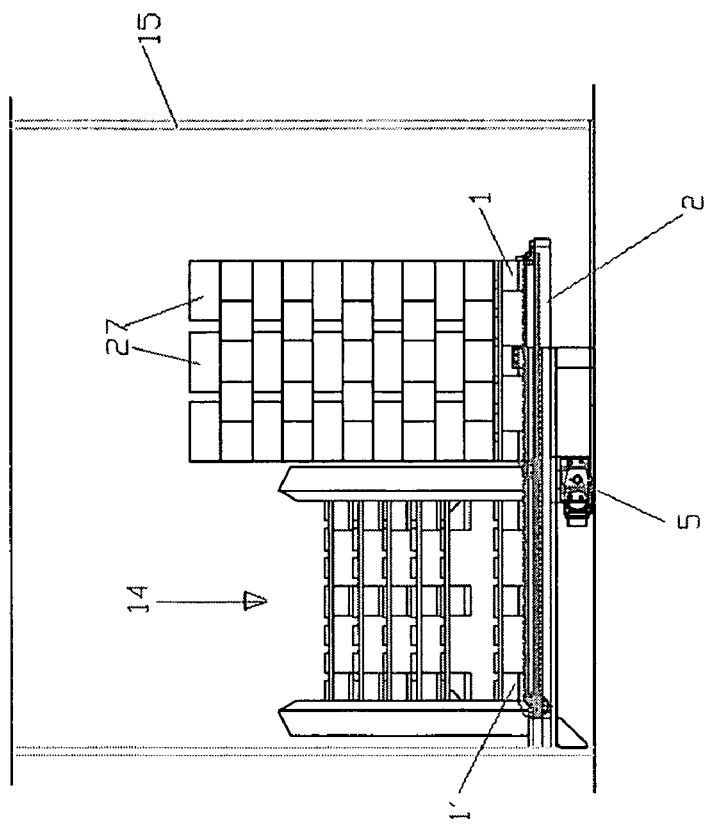
Figure 18:
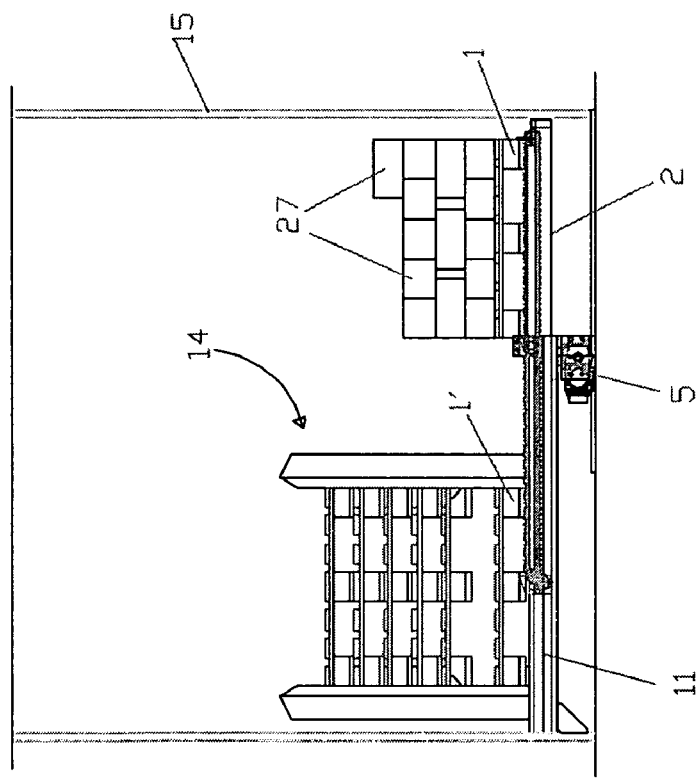

As is shown in FIG. 18, loading of pallet 1 with packaging boxes 27 begins, and at the same time another empty pallet 1' may be separated in pallet magazine 14. Transfer vehicle 2 does not move. When palletizing of pallet 1 has been completed, as shown in FIG. 19 it is returned to its first position, for which purpose limit stop 23 may be reversed by external means and limit stop 24 is passed over by pallet 1'. As soon as transfer vehicle 2 has reached its first position, pallet 1', which was separated previously in pallet magazine 14, may be deposited on first pallet area 3. Full pallet 1 lies directly beside pallet magazine 14.

Figure 21:
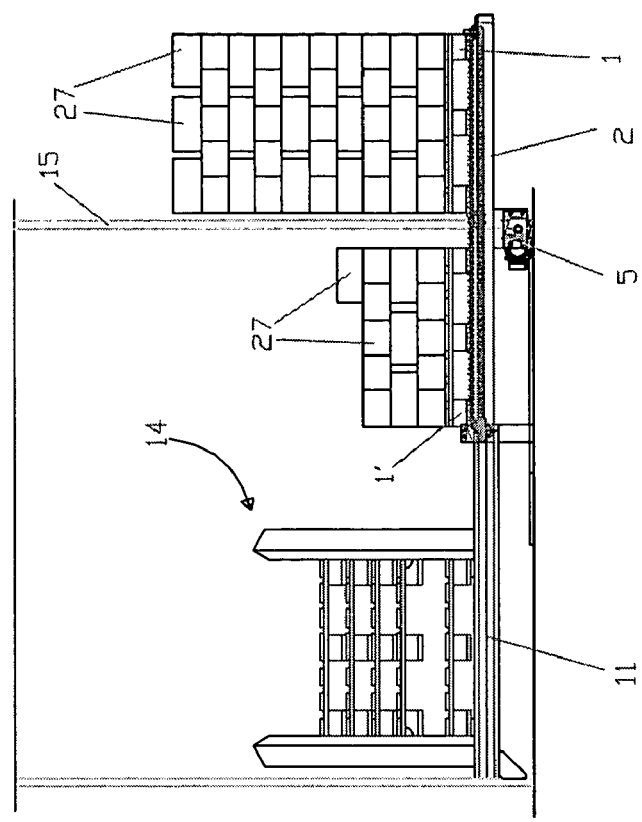
Figure 20:
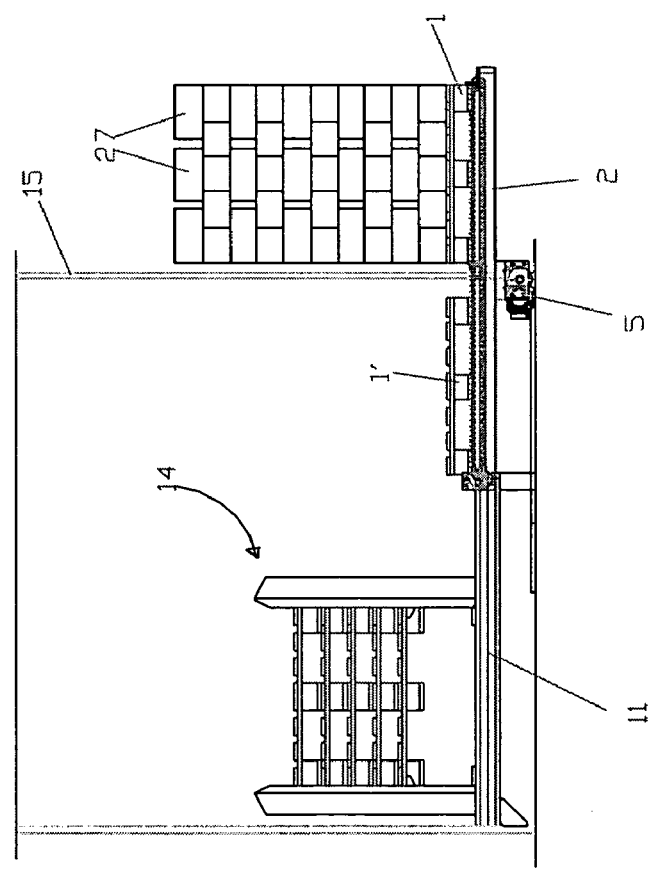

Then, as shown in FIG. 20, transfer vehicle 2 is moved to its second position from its first position as shown in FIG. 19, limit stop 23 being passed over both by pallet 1 and by pallet 1'. In this step, full pallet 1 is transported to collection station C and empty pallet 1' is placed at loading station B. Now, as shown in FIG. 21, the loading of pallet 1' with packaging boxes 27 begins, and at the same time another empty pallet may be separated in pallet magazine 14.

Figure 23:
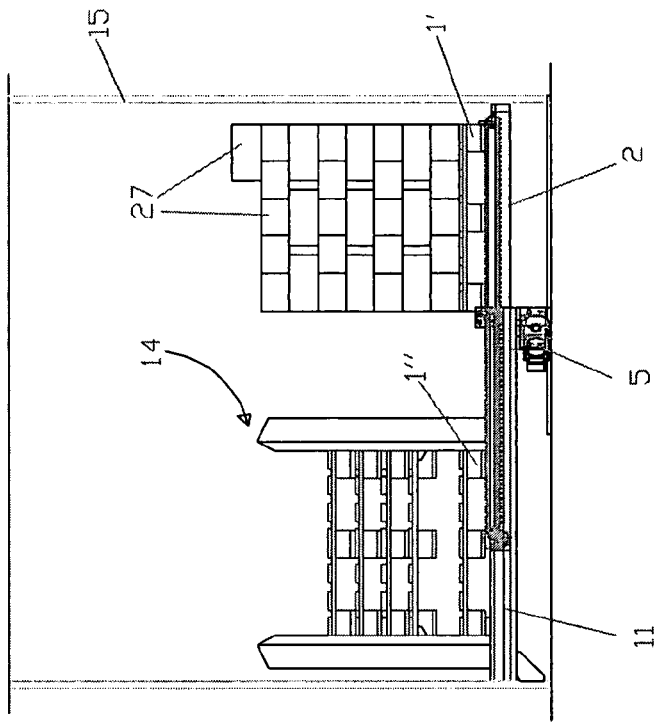
Figure 22:
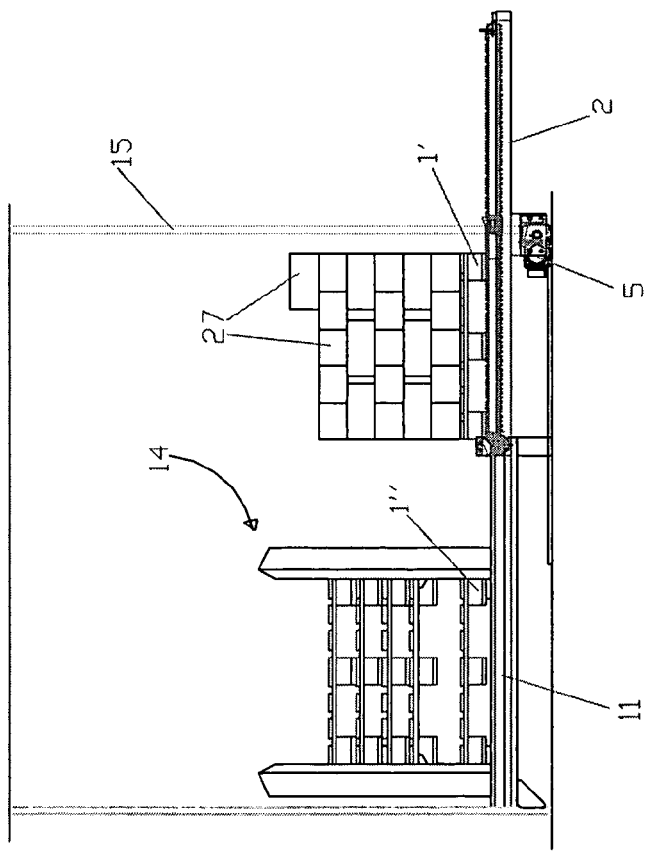

As is shown in FIG. 22, full pallet 1 is then collected from collection station C, while the palletizing process of pallet 1' at loading station B continues without interruption. Finally, also while pallet 1' is still being palletized, transfer vehicle 2 is returned from its second position as shown in FIG. 22 to its third position as shown in FIG. 23, limit stop 23 retaining pallet 1' securely in place at loading station B and limit stop 24 being passed over. Then, the pallet changing process is begun again and repeated as often as necessary starting from the position shown in FIG. 19.

As is evident from the preceding description, the method according to the invention may be performed in conjunction with the device according to the invention without a pallet magazine in such manner that the empty pallet is disposed in the first pallet area of the transfer vehicle while the pallet in the second pallet area is being palletized, the only effect being that the palletizing process must be interrupted briefly. On the other hand, when the device according to the invention is used with a pallet magazine, the empty pallet may not be disposed in the first pallet area until after the pallet in the second pallet area has been fully palletized, since the empty pallet must not be fetched from the pallet magazine until palletizing is completed, as shown in FIG. 19.

If it is essential to be able to deposit the empty pallet in first pallet area 3 of transfer vehicle 2 while the pallet in second pallet area 4 is being palletized in the embodiment with the pallet magazine 14 also, it is further conceivable to construct transfer vehicle 2 correspondingly longer, so that it extends under pallet magazine 14 fully even in the position shown in FIG. 18. Then, an empty pallet 1' may be positioned in the first pallet area 3 while pallet 1 in second pallet area 4 is palletized at loading station B. In this case, the third position provided in the embodiment with the pallet magazine 14 may be dispensed with, and in its second, extended position transfer vehicle 2 protrudes farther out of racking system 15 than is the case in which a shorter transfer vehicle 2 may be moved to a third position.

Figure 24:
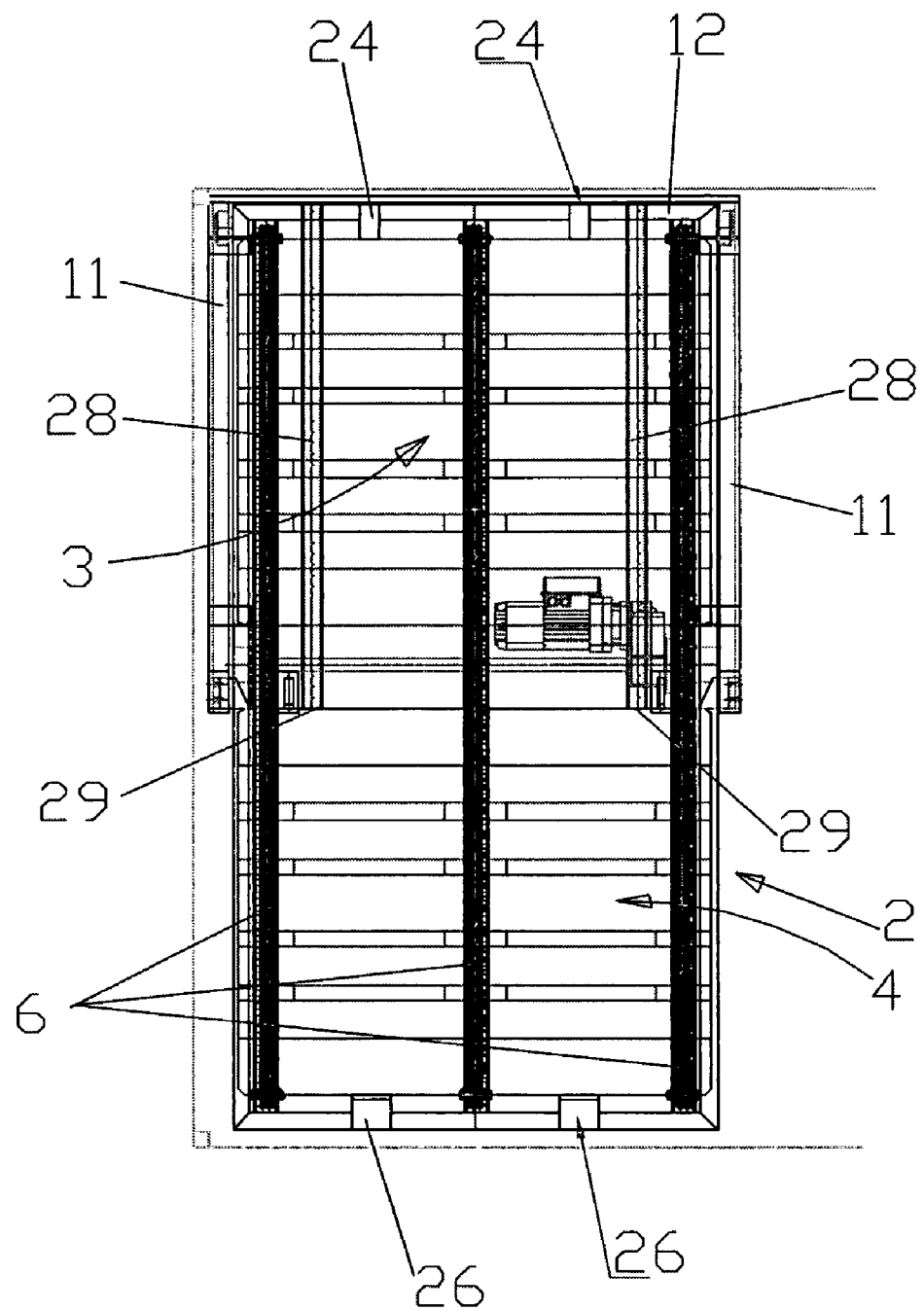
FIG. 24 shows a plan view of a further embodiment of the device of the present invention similar to the one according to FIG. 3.

FIG. 24 shows a plan view of two further embodiments of the device according to the invention, similar to the plan view in FIG. 3. Unlike the embodiment shown in FIG. 3, the limit stop 24 in these embodiments is not able to be passed over but is fixedly attached to transfer vehicle 2. When transfer vehicle 2 returns from the second position as shown in FIG. 11 to the first position as shown in FIG. 12, this fixed limit stop 24 raises empty pallet 1" slightly. Instead of limit stop 21 and attachment 22, at least two elongated supports, particularly tubes 28, as are shown in FIG. 24, may be provided and attached to rack frame 12 and of which at least the upper surfaces project above the plane spanned by multiple strand roller chains 6. As a result, an empty pallet may be deposited on tubes 28 in first pallet area 3 of transfer vehicle 2 at supply station A. Moreover, limit stop 23 may be omitted, since as shown in FIG. 24 frontal surfaces 29 at the lower ends of the support, particularly tubes 28, may function as fixed limit stops for positioning a pallet at loading station B.

For this purpose, the lower ends of tubes 28 may be lengthened or shortened as shown in FIG. 24 by inserting or screwing relatively short tubular elements in the ends or removing them therefrom.

In the embodiment in FIG. 24, limit stops 25 provided on transfer vehicle 2 have been removed without replacement. If necessary, however, the limit stops 25 may be replaced by means for limiting the movement of relative pallet movement means 6. In such case, relative pallet movement means 6, which have unrestricted movement per se, are limited or blocked in such a way that a pallet in second pallet area 4 on transfer vehicle 2 is not able to leave the transfer vehicle 2 downwards, as shown in FIG. 24. A corresponding restriction of the movement of relative pallet movement means 6 may be realized for example via overrunning pulleys cooperating with deflection pulleys 7 and 8.

Figure 25:
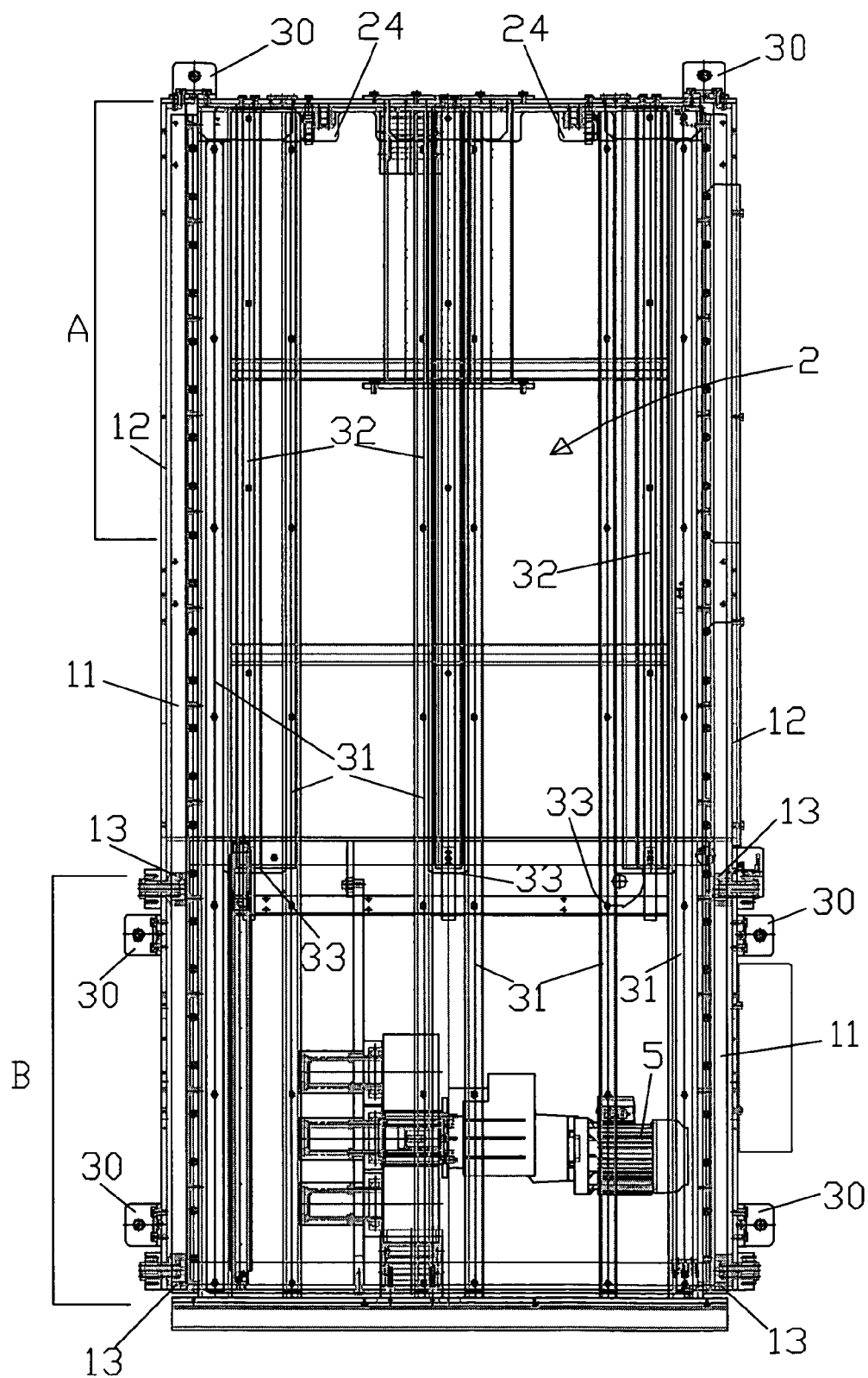
FIG. 25 shows a view of another embodiment of the device of the present invention similar to the one according to FIG. 3 or 24.

FIG. 25 shows a plan view of a further embodiment of the device according to the invention, similar to the plan views shown in FIGS. 3 and 24. The same key is used to designate parts in FIG. 25 that are the same as those of the embodiments in FIGS. 3 and 24.

The transfer vehicle 2 shown in FIG. 25 is designed for operation with a pallet magazine, as described with reference to FIGS. 14 to 23. Unlike the previous descriptions, rack frame 12 extends essentially over the entire length of transfer vehicle 2. Rack frame 12 is secured and supported on the floor of the installation site by a total of six feet 30. The entire rack frame 12 is accommodated inside racking system 15, which is not shown in FIG. 25 (cf. FIGS. 2 and 14 to 23). Supply station A and loading station B are indicated at the left edge of FIG. 25.

Unlike the embodiments previously described, the electric motor 5 provided for driving transfer vehicle 2 is not mounted on the transfer vehicle 2 itself, but is arranged in fixed manner below the plane in which the pallets are deposited at loading location B. The drive impulse is transmitted from electric motor 5 to transfer vehicle 2 via a drive belt, no shown in FIG. 25, which is clamped to transfer vehicle 2. This advantageously reduces the mass of transfer vehicle 2 that needs to be displaced. In a further difference from the previously described embodiments, in the embodiment shown in FIG. 25, rotating guide rollers 13 are attached to stationary rack frame 12, and not to transfer vehicle 2. Accordingly, the preferably U-shaped guide rails 11 are not arranged on rack frame 12, but on transfer vehicle 2, and are moved together with the vehicle.

A total of six sliding strips 31 is provided, attached to transfer vehicle 2, and thus also moving therewith, as non-driven means for relative pallet movement for the purposes of the present invention in the embodiment as shown in FIG. 25. Multiple strand roller chains are thus not present, in a difference from the previous embodiments. In addition, a total of three end limit sliding strips 32 may be seen in FIG. 25, each of which is secured to rack frame 12 and between two sliding strips 31, so that they do not move in concert with transfer vehicle 2. The stationary end limit sliding strips 32 do not extend for the entire length of rack frame 12 or transfer vehicle 2, but their frontal surfaces 33 terminate where loading station B begins, as is shown in FIG. 25. Seen from the opposite perspective to that shown in FIG. 25, end limit sliding strips 32 project slightly above the plane formed by the surfaces of sliding strips 31. As a result, frontal surfaces 33 of end limit sliding strips 32 serve as end stops when transfer vehicle 2 is returned from its second position to its first or third position, and they retain the pallet located at loading station B securely in place. Sliding strips 31, which move together with transfer vehicle 2 are then in contact with the underside of the pallet and slide along the bottom thereof. In this situation, end limit sliding strips 32 have the same function as tubes 28 in the embodiment shown in FIG. 24.

Unlike the previous embodiments, the embodiment as shown in FIG. 25 has no fixed limit stops for taking an empty pallet from supply station A to loading station B, but swiveling limit stops 24 instead. These limit stops 24 are raised by mechanical force when supply station A is occupied and retract downwards out of the way und the effect of gravity when the vehicle returns from loading station B to supply station A. This enables an empty pallet at supply station A to be lowered without difficulty. A pallet to be loaded at loading station B is centering or positioned by the return of transfer vehicle 2 towards supply station A, which causes the pallet to be loaded to strike against frontal surfaces 33 of end limit sliding strips 32.

If supply station A is not supplied from a pallet magazine, the pallet supplied may be centered or positioned at supply station A in the direction perpendicular to the longitudinal direction of transfer vehicle 2 using a suitable limit stop at supply station A. If supply station A is supplied with pallets from a pallet magazine, end limit sliding strips 32 may be replaced by rails having rollers arranged at an angle to the longitudinal direction of transfer vehicle 2, at least in the area of supply station A, which have the effect of centering or positioning the pallet perpendicularly to the longitudinal direction of transfer vehicle 2 as it moves toward loading station B.

The invention claimed is:

1. An automatic palletizer for arranging objects on pallets, comprising:
 a palletizing robot for arranging the objects on the pallets;
 a transfer vehicle having a first pallet area configured for supporting a first pallet and a second pallet area configured for supporting a second pallet;

a drive unit for moving the transfer vehicle between a first position and a second position;

wherein in the first position, the first pallet may be positioned in the first pallet area of the transfer vehicle; and wherein in the second position, objects may be arranged on the first pallet in the first pallet area of the transfer vehicle, and the second pallet may be removed from the second pallet area of the transfer vehicle, the palletizer further comprising:

a racking system provided to separate the palletizer from its surroundings;

wherein in the first position, the transfer vehicle is fully contained within the racking system; and wherein in the second position, at least the second pallet area of the transfer vehicle protrudes from the racking system such that a pallet loaded with objects and located in the second pallet area can be removed from the transfer vehicle outside of the racking system.

2. The pallet manipulating device of claim 1, wherein in the first position, objects may be arranged on the second pallet in the second pallet area of the transfer vehicle while the first pallet is being positioned in the first pallet area of the transfer vehicle.

3. The pallet manipulating device of claim 1, further comprising: a relative pallet movement mechanism supported on the transfer vehicle, the relative pallet movement mechanism for moving the first pallet relative to the transfer vehicle from the first pallet area to the second pallet area in response to movement of the transfer vehicle away from the second position.

4. The pallet manipulating device of claim 3, further comprising: at least one limit stop engageable with the first pallet for holding the first pallet substantially stationary relative to its surroundings while the transfer vehicle is moved underneath the first pallet, to move the first pallet from the first pallet area to the second pallet area.

5. The pallet manipulating device of claim 4, wherein the relative pallet movement mechanism comprises: a plurality of rollers rotatably supported on the transfer vehicle and at least partially supporting the first pallet such that the plurality of rollers rotate in response to the movement of the first pallet from the first pallet area to the second pallet area.

6. The pallet manipulating device of claim 4, wherein the relative pallet movement mechanism comprises: a flexible member supported on at least two deflection pulleys in an endlessly rotatable manner, the flexible member supporting the first pallet during movement of the first pallet from the first pallet area to the second pallet area.

7. The pallet manipulating device of claim 6, wherein the flexible member comprises: at least one chain or at least one belt.

8. The pallet manipulating device of claim 4, wherein the relative pallet movement mechanism comprises: at least one sliding strip supported on the transfer vehicle and at least partially supporting the first pallet, the first pallet slidably engaging the at least one sliding strip such that the first pallet slides along the at least one sliding strip during the movement of the first pallet from the first pallet area to the second pallet area.

9. The pallet manipulating device of claim 1, further comprising: at least one drive wheel powered by the drive unit to move the transfer vehicle.

10. The pallet manipulating device of claim 9, further comprising: at least one wheel rail for engaging and guiding the at least one drive wheel, the at least one drive wheel or the at least one wheel rail being supported on the transfer vehicle, such that powering the at least one drive wheel moves the at least one drive wheel with respect to the at least one wheel rail to move the transfer vehicle.

11. The pallet manipulating device of claim 1, further comprising a guide mechanism having at least one guide rail for engaging and guiding the transfer vehicle, wherein the at least one guide rail is at least half as long as the transfer vehicle, and at least half of the transfer vehicle is advanced into the at least one guide rail in the first position, such that the transfer vehicle is supported in the manner of a cantilever.

12. The pallet manipulating device of claim 11, wherein movement of the transfer vehicle between its first and second positions corresponds to at least half the length of the transfer vehicle, and the transfer vehicle is still supported by the guide rails in its second position.

13. The pallet manipulating device of claim 11, further comprising: at least one support wheel supporting the transfer vehicle at least one end of the transfer vehicle.

14. A method for manipulating pallets with an automatic palletizer and for arranging objects on the pallets, wherein the automatic palletizer comprises a palletizing robot for arranging the objects on the pallets and a transfer vehicle and wherein a racking system separates the automatic palletizer from its surroundings, the method comprising:

positioning the transfer vehicle in a first position, wherein in the first position the transfer vehicle is fully contained within the racking system, the transfer vehicle having a first pallet area and a second pallet area, wherein in the first position the first pallet area is at a supply station and the second pallet area is at a loading station;

positioning an empty pallet in the first pallet area of the transfer vehicle while the transfer vehicle is in the first position;

loading a pallet located in the second pallet area with objects while at the loading station; and moving the transfer vehicle to a second position wherein the second pallet area protrudes from the racking system to a temporary collection station and the first pallet area is at the loading station.

15. The method of claim 14, further comprising:

removing the pallet located in the second pallet area while the transfer vehicle is in the second position; and retaining the pallet at the loading station while moving the transfer vehicle underneath the pallet, to cause the pallet to be moved along the transfer vehicle from the first pallet area to the second pallet area.

16. The method of claim 15, wherein the step of retaining the pallet at the loading station while moving the transfer vehicle comprises:

moving the transfer vehicle to the first position;

wherein in the first position the second pallet area is at the loading station.

17. An automatic palletizer for arranging objects on pallets, comprising:

a palletizing robot for arranging the objects on the pallets;

a transfer vehicle having a first pallet area configured for supporting a first pallet and a second pallet area configured for supporting a second pallet;

a drive unit for moving the transfer vehicle between a first position, a second position and a third position;

wherein in the first position, the first pallet may be positioned in the first pallet area of the transfer vehicle;

wherein in the second position, objects may be arranged on the first pallet in the first pallet area of the transfer vehicle, and the second pallet may be removed from the second pallet area of the transfer vehicle; and wherein in the third position spaced between the first and second positions, objects may be arranged on the second pallet in the second pallet area of the transfer vehicle; the palletizer further comprising:
a racking system provided to separate the palletizer from its surroundings;
wherein in the first and third positions, the transfer vehicle is fully contained within the racking system; and
wherein in the second position, at least the second pallet area of the transfer vehicle protrudes from the racking system such that a pallet loaded with objects and located in the second pallet area can be removed from the transfer vehicle outside of the racking system.

18. The pallet manipulating device of claim 17, further comprising: a relative pallet movement mechanism supported on the transfer vehicle, the relative pallet movement mechanism for moving the first pallet relative to the transfer vehicle from the first pallet area to the second pallet area in response to movement of the transfer vehicle away from the second position.

19. The pallet manipulating device of claim 18, further comprising: at least one limit stop engageable with the first pallet for holding the first pallet substantially stationary relative to its surroundings while the transfer vehicle is moved underneath the first pallet, to move the first pallet from the first pallet area to the second pallet area.

20. The pallet manipulating device of claim 19, wherein the relative pallet movement mechanism comprises: a plurality of rollers rotatably supported on the transfer vehicle and at least partially supporting the first pallet such that the plurality of rollers rotate in response to the movement of the first pallet from the first pallet area to the second pallet area.

21. The pallet manipulating device of claim 19, wherein the relative pallet movement mechanism comprises: a flexible member supported on at least two deflection pulleys in an endlessly rotatable manner, the flexible member supporting the first pallet during movement of the first pallet from the first pallet area to the second pallet area.

22. The pallet manipulating device of claim 21, wherein the flexible member comprises: at least one chain or at least one belt.

23. The pallet manipulating device of claim 19, wherein the relative pallet movement mechanism comprises: at least one sliding strip supported on the transfer vehicle and at least partially supporting the first pallet, the first pallet slidably engaging the at least one sliding strip such that the first pallet slides along the at least one sliding strip during the movement of the first pallet from the first pallet area to the second pallet area.

24. The pallet manipulating device of claim 17, further comprising: at least one drive wheel powered by the drive unit to move the transfer vehicle.

25. The pallet manipulating device of claim 24, further comprising: at least one wheel rail for engaging and guiding the at least one drive wheel, the at least one drive wheel or the at least one wheel rail being supported on the transfer vehicle, such that powering the at least one drive wheel moves the at least one drive wheel with respect to the at least one wheel rail to move the transfer vehicle.

26. The pallet manipulating device of claim 17, further comprising: a guide mechanism having at least one guide rail for engaging and guiding the transfer vehicle, wherein the at least one guide rail is at least half as long as the transfer vehicle, and at least half of the transfer vehicle is advanced into the at least one guide rail in the first position, such that the transfer vehicle is supported in the manner of a cantilever.

27. The pallet manipulating device of claim 26, wherein movement of the transfer vehicle between its first and second positions corresponds to at least half the length of the transfer vehicle, and the transfer vehicle is still supported by the guide rails in its second position.

28. The pallet manipulating device of claim 26, further comprising: at least one support wheel supporting the transfer vehicle at an end of the transfer vehicle farthest from the guide rails.

29. The pallet manipulating device of claim 17, further comprising: a pallet magazine for storing empty pallets, and via which the first pallet area can be supplied with an empty pallet from the pallet magazine when the transfer vehicle is in the first position.

30. A method for manipulating pallets with an automatic palletizer and for arranging objects on the pallets, wherein the automatic palletizer comprises a palletizing robot for arranging the objects on the pallets and a transfer vehicle, and wherein a racking system separates the automatic palletizer from its surroundings, the method comprising:
positioning the transfer vehicle in a first position, wherein in the first position the transfer vehicle is fully contained within the racking system, the transfer vehicle having a first pallet area and a second pallet area, wherein in the first position the first pallet area is at a supply station;
positioning an empty pallet in the first pallet area of the transfer vehicle while the transfer vehicle is in the first position;
positioning the transfer vehicle in a third position such that the second pallet area is at a loading station, wherein in the third position the transfer vehicle is fully contained within the racking system, and loading a pallet located in the second pallet area with objects while at the loading station; and
moving the transfer vehicle to a second position wherein the second pallet area protrudes from the racking system to a temporary collection station and the first pallet area is at the loading station.

31. The method of claim 30, further comprising:
removing the pallet located in the second pallet area while the transfer vehicle is in the second position; and
retaining the pallet at the loading station while moving the transfer vehicle underneath the pallet, to cause the pallet to be moved along the transfer vehicle from the first pallet area to the second pallet area.

32. The method of claim 31, wherein the step of retaining the pallet at the loading station while moving the transfer vehicle comprises:
moving the transfer vehicle to the third position,
wherein in the third position the second pallet area is at the loading station.

* * * * *